(12) United States Patent
Chang et al.

(10) Patent No.: US 11,943,077 B2
(45) Date of Patent: *Mar. 26, 2024

(54) MULTIDROP NETWORK SYSTEM AND NETWORK DEVICE

(71) Applicant: REALTEK SEMICONDUCTOR CORPORATION, Hsinchu (TW)

(72) Inventors: Yung-Le Chang, Hsinchu (TW); Wen-Chih Fang, Hsinchu (TW); Deng-Shian Wang, Hsinchu (TW); Shieh-Hsing Kuo, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 15 days.

This patent is subject to a terminal disclaimer.

(21) Appl. No.: 17/828,065

(22) Filed: May 31, 2022

(65) Prior Publication Data

US 2023/0037027 A1 Feb. 2, 2023

(30) Foreign Application Priority Data

Jul. 23, 2021 (TW) .................................. 110127184

(51) Int. Cl.
*H04L 41/5054* (2022.01)
*H04L 12/40* (2006.01)
*H04L 12/403* (2006.01)

(52) U.S. Cl.
CPC .... *H04L 12/4035* (2013.01); *H04L 12/40019* (2013.01); *H04L 12/40084* (2013.01)

(58) Field of Classification Search
CPC .......... H04L 12/4035; H04L 12/40019; H04L 12/40084
See application file for complete search history.

(56) References Cited

U.S. PATENT DOCUMENTS

| 9,438,537 | B2 * | 9/2016 | Edmiston | H04L 49/9063 |
| 2002/0090968 | A1 * | 7/2002 | Lee | H04W 72/566 |
| | | | | 455/527 |
| 2005/0111477 | A1 * | 5/2005 | Ghanma | H04L 12/413 |
| | | | | 370/445 |
| 2007/0116031 | A1 * | 5/2007 | Chung | H04W 76/40 |
| | | | | 370/445 |
| 2009/0022174 | A1 * | 1/2009 | Wang | H04W 74/08 |
| | | | | 370/462 |

(Continued)

*Primary Examiner* — Abdelnabi O Musa
(74) *Attorney, Agent, or Firm* — WPAT, P.C

(57) ABSTRACT

A multidrop network system includes N network devices. The N network devices include a master device and multiple slave devices, and each network device has an identification code as its own identification in the multidrop network system. The N network devices have N identification codes and obtain transmission opportunities in turn according to the N identification codes in each round of data transmission. Each network device performs a count operation to generate a current count value, and when the identification code of a network device is the same as the current count value, this network device obtains a transmission opportunity. After a device obtains the transmission opportunity, it determines whether a cut-in signal from another network device is observed in a front duration of a predetermined time slot, and then determines whether to abandon/defer the right to start transmitting in the remaining duration of the predetermined time slot.

20 Claims, 2 Drawing Sheets

(56) References Cited

U.S. PATENT DOCUMENTS

| | | | |
|---|---|---|---|
| 2013/0208708 A1* | 8/2013 | Nezou ................... | H04W 74/08 370/336 |
| 2014/0003325 A1* | 1/2014 | Tanimoto .............. | H04W 16/26 370/315 |
| 2019/0230705 A1* | 7/2019 | Beruto ................ | H04W 74/085 |
| 2023/0010016 A1* | 1/2023 | Chang .............. | H04L 25/03343 |
| 2023/0021997 A1* | 1/2023 | Chang ................... | H04L 12/413 |

* cited by examiner

MULTIDROP NETWORK SYSTEM AND NETWORK DEVICE

BACKGROUND OF THE INVENTION

1. Field of the Invention

The present disclosure relates to a network system and a network device, especially to a multidrop network system and a network device of the multidrop network system.

2. Description of Related Art

The US patent application publication of publication number US2019/0230705A1 discloses a method to prevent packet collision in an Ethernet multidrop network. In regard to the above method, the number of nodes sustained by a multidrop network should be preplanned and a new node is not allowed to join the multidrop network dynamically. In addition, according to the method, all nodes in a multidrop network have to transmit in turn and a node having the demand for instant transmission cannot transmit preferentially; more specifically, each node is allowed to transmit in its allocated time slot when it earns a transmission opportunity and cannot transmit ahead of schedule without earning the transmission opportunity. In light of the above, the method cannot support instant packet transmission.

SUMMARY OF THE INVENTION

An object of the present disclosure is to disclose a multidrop network system and a network device of the multidrop network system as improvements over the prior art.

An embodiment of the multidrop network system of the present disclosure includes N network devices, wherein the N is greater than or equal to two. The N network devices includes a master device and (N−1) slave device(s). Each of the N network devices has an identification code as an identification in the multidrop network system and thus the N network devices having N identification codes in total. The N network devices earn their respective transmission opportunities in turn according to the N identification codes in each round of data transmission of the multidrop network system. Each of the N network devices performs a count operation to generate a current count value. When the identification code of a $K^{th}$ device of the N network devices is the same as the current count value, the $K^{th}$ device earns a $K^{th}$-device transmission opportunity of the transmission opportunities, in which the K is a positive integer not greater than the N. After earning the $K^{th}$-device transmission opportunity, the $K^{th}$ device makes a determination of whether a cut-in signal from another network device is observed in a front duration of a predetermined time slot, and then determines whether to abandon or defer a right to start transmitting in a back duration of the predetermined time slot according to the determination.

An embodiment of the network device of the present disclosure is a cooperative network device among N network devices of a multidrop network system, wherein the N is greater than or equal to two. The N network devices earn their respective transmission opportunities in turn in the multidrop network system. The N network devices includes a master device and (N−1) slave device(s). Each of the N network devices has an identification code as an identification in the multidrop network system. Each of the N network devices performs a predetermined operation to generate a current value. When the identification code of the cooperative network device is the same as the current value, the cooperative network device earns a cooperative-device transmission opportunity of the transmission opportunities. After earning the cooperative-device transmission opportunity, the cooperative network device makes a determination of whether a cut-in signal from another network device is observed in a front duration of a predetermined time slot, and then determines whether to abandon or defer a right to start transmitting in a back duration of the predetermined time slot according to the determination.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present specification discloses a multidrop network system and a network device of the multidrop network system. The multidrop network system and network device support instant transmission and allow a new node (i.e., a new network device) to join the multidrop network system. The background knowledge of a multidrop network system is found in the IEEE 802.3 standard and the US patent application publication of publication number US2019/0230705A1.

Figure 1:
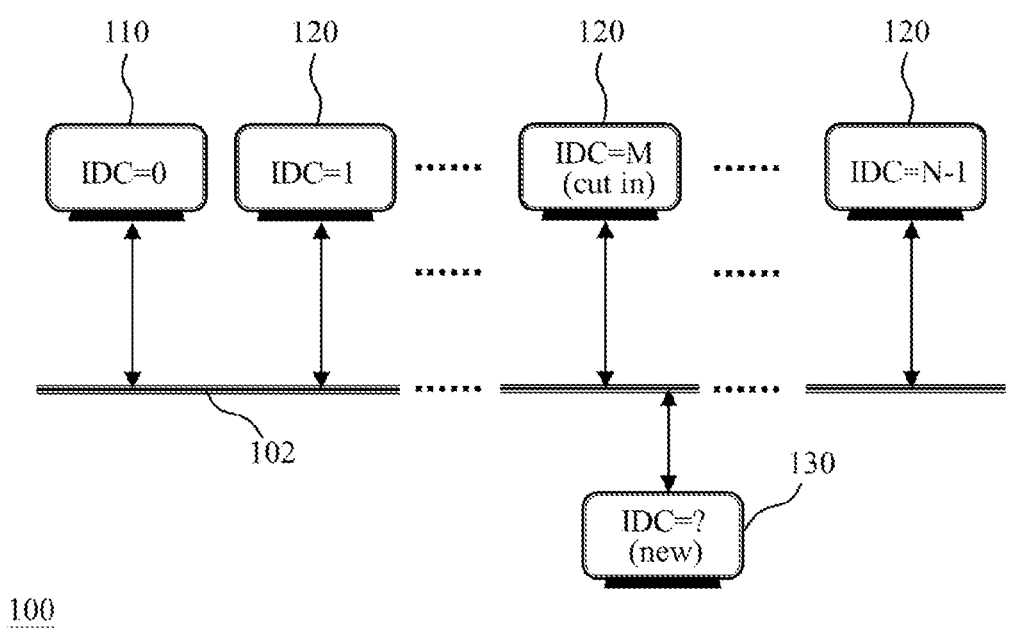
FIG. 1 shows an embodiment of the multidrop network system of the present disclosure.

FIG. 1 shows an embodiment of the multidrop network system of the present disclosure. The configuration of the multidrop network system 100 in FIG. 1 is based on the IEEE 802.3 standard and includes N network devices (i.e., N nodes), wherein the N is an integer equal to or greater than two. The N network devices exchange data through a physical transmission medium 102 (e.g., twisted pair cable or optical cable), and include a master device 110 and (N−1) slave device(s) 120. Each of the N network devices has its own identification code (IDC) as an identification in the multidrop network system 100 and thus the N network devices have N IDCs (e.g., 0, 1, 2, . . . , (N−2), and (N−1)) in total, but the implementation of the present invention is not limited to the above features. The N network devices obtain their respective transmission opportunities in turn according to the N IDCs in each round of data transmission of the multidrop network system 100.

In regard to the embodiment of FIG. 1, each of the N network devices performs a predetermined operation (e.g., an incremental count operation counting from 0 to (N−1), or a decremental count operation counting from (N−1) to 0, or a known/self-developed polling operation) to generate a current value, and the N network devices have the same current value. When the IDC of a $K^{th}$ device of the N network devices is the same as the current value, the $K^{th}$ device earns its transmission opportunity (hereinafter referred to as the $K^{th}$-device transmission opportunity) of the aforementioned transmission opportunities, wherein the K is a positive integer not greater than the N. For better understanding of the present embodiment, in the following description the predetermined operation is an incremental count operation and the current value is a current count value. After the $K^{th}$ device earns the $K^{th}$-device transmission opportunity, there are several circumstances as follows:

(1) If the $K^{th}$ device has no need to transmit, the $K^{th}$ device is silent in a duration of a predetermined time slot; if no cut-in signal is observed in a front duration of the predetermined time slot, each of the N network devices increases its current count value by one (or resets its current count value to a default value when the current count value is the maximum count value) to update the current count value after the predetermined time slot elapses; if the increased current count value is equal to the IDC of a $(K+1)^{th}$ device (or the reset current count value is equal to the IDC of a $1^{st}$ device), the $(K+1)^{th}$ device (or the $1^{st}$ device) is assigned the $K^{th}$-device transmission opportunity.

The duration of the predetermined time slot is determined according to the demand for implementation, and is not specified in the IEEE 802.3cg standard; for example, the length of the predetermined time slot is longer than the length of any predetermined time slot specified by the IEEE 802.3cg standard. However, the above-mentioned features are not limitations on the implementation of the present invention.

(2) If the $K^{th}$ device has no need to transmit and a cut-in signal of another network device is observed in the front duration of the predetermined time slot, the another network device takes over the $K^{th}$-device transmission opportunity, and each network device increases its current count value by one (or resets its current count value) to update the current count value after the another network device finishes its transmission; if the updated current count value is equal to the IDC of the $(K+1)^{th}$ device (or the $1^{st}$ device), the $(K+1)^{th}$ device (or the $1^{st}$ device) earns its transmission opportunity. It is noted that the total transmission time of the another network device is determined according to the another network device's demand and/or the requirements of the multidrop network system 100, and is not limited to the length of the predetermined time slot.

The another network device can be one of the N network devices (e.g., the salve device 120 marked with "cut in" in FIG. 1), or be a network device asking to join the multidrop network system 100 (e.g., the network device marked with "new" in FIG. 1). A nonrestrictive example of the front duration of the predetermined time slot is top one-$X^{th}$ of the predetermined time slot, wherein the X is a number greater than one (e.g., X=2 or X=3).

It is noted that if multiple devices of the N network devices except the $K^{th}$ device want to cut in, one of the multiple devices will be assigned the $K^{th}$-device transmission opportunity according to the order of the IDCs of the multiple devices and/or other orders (e.g., the priority of the multiple devices' data to be transmitted). Once one of the multiple network devices wins the $K^{th}$-device transmission opportunity in the duration of the predetermined time slot of the $K^{th}$ device, the other network device(s) cannot try to cut in until the start of the duration of a predetermined time slot of the $(K+1)^{th}$ device (or the $1^{st}$ device). During the transmission time of any of the N network devices, none of the other network device(s) is allowed to transmit in order to prevent packet collision.

Figure 2:
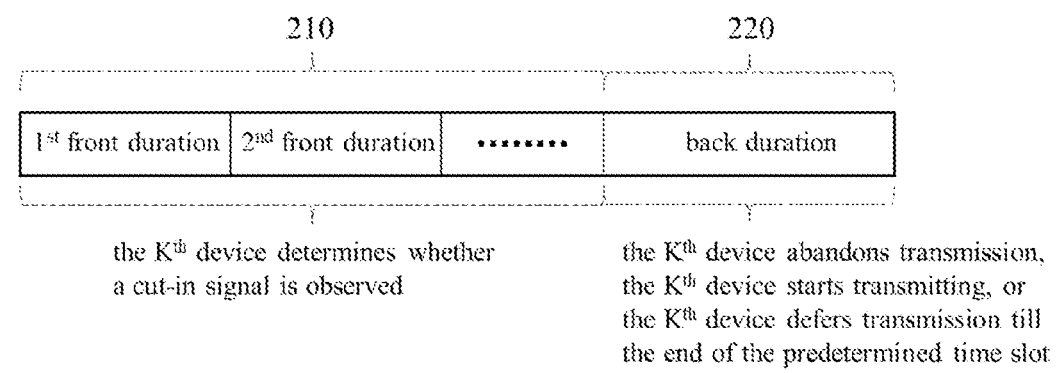
FIG. 2 shows an embodiment of the predetermined time slot of each network device of FIG. 1.

According to the demand for implementation, the front duration of the predetermined time slot can be divided into multiple parts (e.g., the front duration 210 of the predetermined time slot 200 in FIG. 2) including a first front duration, a second front duration, and so on and so forth. In the first front duration, the network device(s) having the highest transmission priority (or the highest demand for transmission) is/are allowed to contend for a cut-in opportunity; if no devices contend for the cut-in opportunity, the network device(s) having the second-highest transmission priority is/are allowed to contend for the cut-in opportunity; and so on.

(3) If the $K^{th}$ device needs to transmit and no cut-in signal is observed by the $K^{th}$ device in the front duration of the predetermined time slot, the $K^{th}$ device starts its transmission operation after the end of the front duration; after the $K^{th}$ device finishes its transmission operation, each of the N network devices increases its current count value by one (or resets its current count value) to update the current count value; and if the updated current count value is equal to the IDC of the $(K+1)^{th}$ device (or the $1^{st}$ device), the $(K+1)^{th}$ device (or the $1^{st}$ device) earns the its transmission opportunity. It is noted that the total transmission time of the $K^{th}$ device is determined according to the $K^{th}$ device's demand and/or the requirements of the multidrop network system 100, and is not limited to the length of the predetermined time slot.

(4) If the $K^{th}$ device needs to transmit but receives a cut-in signal from the another network device in the front duration of the predetermined time slot, the $K^{th}$ device abandons or defers its right to start transmitting in a back duration (e.g., the back duration 220 of the predetermined time slot 200 in FIG. 2) of the predetermined time slot. In an exemplary implementation, after receiving the cut-in signal, the $K^{th}$ device abandons its right to transmit and the another network device takes over the right; after the another network device finishes its transmission, each network device increases its current count value by one (or resets its current count value) to update the current count value; and if the updated current count value is equal to the IDC of the $(K+1)^{th}$ device (or the $1^{st}$ device), the $(K+1)^{th}$ device (or the $1^{st}$ device) earns the its transmission opportunity. In an exemplary implementation, the cut-in signal is a predetermined signal (e.g., a signal with a predetermined pattern) and recognizable to the N network devices; after receiving the cut-in signal, the device(s) including the $K^{th}$ device stop(s) counting to allow the another network device to transmit; after the another network device finishes its transmission, the device(s) resume(s) counting and thus the $K^{th}$ device merely defers its right to transmit rather than abandons the right.

It is noted that the back duration of the predetermined time slot can follow the front duration of the predetermined time slot, but the implementation of the present invention is not limited thereto.

(5) If the $K^{th}$ device needs instant transmission, the $K^{th}$ device can start transmitting in the front duration of the predetermined time slot or determine whether to start transmitting in the front duration according to the rank of the $K^{th}$ device's IDC among all the ranks of the N IDCs and/or according to other predetermined orders (e.g., the priority of the $K^{th}$ device's data to be transmitted); after the $K^{th}$ device finishes its transmission, each network device increases its current count value by one (or resets its current count value) to update the current count value; and if the updated current count value is equal to the IDC of the $(K+1)^{th}$ device (or the $1^{st}$ device), the $(K+1)^{th}$ device (or the $1^{st}$ device) earns its transmission opportunity.

It is noted that if the predetermined operation is another kind of operations (e.g., a decremental count operation), those having ordinary skill in the art can derive the corresponding circumstances from the above description. The incremental/decremental count operation can be realized with known/self-developed technologies (e.g., counter/timer).

In regard to the embodiment of FIG. 1 and the description in the preceding paragraphs, the $K^{th}$ device is the master device 110 or one of the (N−1) slave device(s) 120. The cut-in signal is a data signal or a request signal from the another network device asking to join the multidrop network system 100. When the cut-in signal is a data signal, the another network device is one of the N network devices, and can be the master device 110 or one of the (N−1) slave device(s) 120 (e.g., the salve device 120 marked with "cut in" in FIG. 2, wherein this slave device 120 has an IDC "M" being a positive integer not greater than the N and not equal to the K). When the cut-in signal is the request signal, the another network device is a new device and its IDC is not yet determined (e.g., the device 130 marked with "new" and "IDC=?" in FIG. 2), and the new device is not any of the N network devices; and after the new device joins the multidrop network system 100, the new device acts as a slave device.

On the basis of the above, if the cut-in signal is the request signal, the count range of the current count value should be adjusted to the affiliation of the another network device. Normally, the count range is defined by the difference between a maximum count value (e.g., N−1) and a minimum count value (e.g., 0). The difference could be equal to the number of effective nodes (i.e., devices that can earn transmission opportunities in turn in the multidrop network system 100) in the multidrop network system 100, but the present invention is not limited thereto. For example, if the N network devices receive the request signal in a round of data transmission of the multidrop network system 100, the master device 110 adjusts the count range of the current count value (e.g., increases the maximum count value by one) after this round of data transmission finishes (i.e., when or before a next round of data transmission begins). For another example, if the N network devices receive the request signal in a round of data transmission of the multidrop network system 100, the (N−1) slave device(s) 120 is/are silent after receiving the request signal; and after receiving the request signal, the master device 110 adjusts the count range of the current count value (e.g., increasing the maximum count value by one) before the end of the round of data transmission and then sends out a beacon to notify all the slave device(s) 120 of the start of the next round of data transmission.

In regard to the embodiment of FIG. 1, the IDC of the master device 110 is the minimum count value, and after the current count value reaches the maximum count value in a current round of data transmission, each of the N network devices resets its current count value to the minimum count value in order to start the next round of data transmission. However, the implementation of the present invention is not limited to the above features; more specifically, provided that the N network devices of the multidrop network system 100 adopt the same predetermined operation (e.g., known/self-developed polling operation) to obtain their respective transmission opportunities in sequence, the present invention can play a role through the aforementioned utilization of the predetermined time slot.

In regard to the embodiment of FIG. 1, the duration of each round of data transmission of the N network devices is defined according to two successive beacons, the another network device ascertains the value of the N according to the length of the predetermined time slot and the transmission statuses of the N network devices within the interval between the two successive beacons, and afterward the another network device uses a new IDC (e.g., N) as its identification in the multidrop network system according to the value of N, wherein the new IDC is different from any of the N IDCs owned by the N network devices. In an exemplary implementation, if none of the N network devices transmits in the interval between the two successive beacons, each of the N network devices merely consumes the duration of the predetermined time slot during the interval and thus the another network device can estimate the value of the N according to the following equation:

$$N \cong \text{interval between the two successive beacons/duration of the predetermined time slot}$$

In another exemplary implementation, if an $M^{th}$ network device transmits in the interval between the two successive beacons (i.e., a first beacon and a second beacon) while the other (N−1) network device(s) do(es) not transmit in the interval, the another network device can ascertain the start and end of the transmission of the $M^{th}$ network device according to the $M^{th}$ network device's transmitting data or status, and then the another network device can estimate the value of the N according to the following equation:

$$N \cong \frac{\text{time point of the first beacon} - \text{time point of the } M^{th} \text{ network device starting transmitting}}{\text{duration of the predetermined time slot}} + 1 + \frac{\text{time point of the } M^{th} \text{ network device finishing transmitting} - \text{time point of the second beacon}}{\text{duration of the predetermined time slot}}.$$

Other ways to estimate the value of the N can be derived from the above description.

It is noted that the aforementioned new IDC of the another network device can be determined by other means without the value of the N. For example, when a physical layer (not shown) of the master device 110 receives the request signal from the another network device, the physical layer can forward the request signal or the information thereof to an upper layer (e.g., application layer) (not shown) of the master device 110, and then the upper layer can determine the new IDC accordingly; afterward, the master device 110 provides the new IDC for the another network device through the physical layer, and adjusts the count range of the current count value.

Each network device of the multidrop network system 100 in FIG. 1 can be implemented independently as a cooperative network device incorporating the inventive features of the present disclosure. Since people having ordinary skill in the art can refer to the description of the multidrop network system 100 in FIG. 1 to appreciate the detail and modification of each network device of the multidrop network system 100, repeated and redundant description is omitted here. It is noted that all effective nodes in the multidrop network system 100 are supposed to include the present invention to normally operate under the same protocol.

It should be noted that people of ordinary skill in the art can selectively use some or all of the features of any embodiment in this specification or selectively use some or all of the features of multiple embodiments in this specification to implement the present invention as long as such implementation is practicable; in other words, the present invention can be carried out flexibly in accordance with the present disclosure.

To sum up, the present invention supports instant transmission (e.g., instant messaging) and allows the affiliation of a new node without significantly changing the configuration of a multidrop network system.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A multidrop network system comprising N network devices, the N network devices including a master device and (N−1) slave device(s), each of the N network devices having an identification code as an identification in the multidrop network system and thus the N network devices having N identification codes in total, the N network devices earning transmission opportunities in turn according to the N identification codes in each round of data transmission of the multidrop network system, and each of the N network devices performing a count operation to generate a current count value, wherein:
   the N is an integer greater than or equal to two;
   when the identification code of a $K^{th}$ device of the N network devices is the same as the current count value, the $K^{th}$ device earns a $K^{th}$-device transmission opportunity of the transmission opportunities, in which the K is a positive integer not greater than the N; and
   after earning the $K^{th}$-device transmission opportunity, the $K^{th}$ device makes a determination of whether a cut-in signal from another network device is observed in a front duration of a predetermined time slot, and then determines whether to abandon or defer a right to start transmitting in a back duration of the predetermined time slot according to the determination.

2. The multidrop network system of claim 1, wherein the $K^{th}$ device is the master device or one of the (N−1) slave device(s); the cut-in signal is a data signal, or the cut-in signal is a request signal from the another network device asking to join the multidrop network system; and after receiving the cut-in signal, the $K^{th}$ device abandons or defers the right to start transmitting in the back duration of the predetermined time slot.

3. The multidrop network system of claim 2, wherein the cut-in signal is the data signal; and the another network device is one of the N network devices except the $K^{th}$ device.

4. The multidrop network system of claim 2, wherein the cut-in signal is the request signal; and the another network device is not any of the N network devices.

5. The multidrop network system of claim 4, wherein the master device receives the request signal in a round of data transmission of the multidrop network system, and accordingly adjusts a count range of the current count value after the round of data transmission finishes.

6. The multidrop network system of claim 5, wherein the count range is defined by a difference between a maximum count value and a minimum count value; and after receiving the request signal, the master device increases the count range after the round of data transmission finishes.

7. The multidrop network system of claim 6, wherein the master device increases the maximum count value to increase the count range; before increasing the count range, the maximum count value is equal to (N−1); and after increasing the count range, the maximum count value is equal to N.

8. The multidrop network system of claim 6, wherein the identification code of the master device is equal to the minimum count value.

9. The multidrop network system of claim 6, wherein after the current count value reaches the maximum count value, each of the N network devices resets the current count value to the minimum count value.

10. The multidrop network system of claim 1, wherein when the determination indicates that the cut-in signal is not observed, in a circumstance that the $K^{th}$ device has no need to transmit, a $(K+1)^{th}$ device of the N network devices is assigned the $K^{th}$-device transmission opportunity after the predetermined time slot elapses.

11. The multidrop network system of claim 1, wherein a duration of each round of data transmission of the multidrop network system is defined according to two successive beacons; the another network device ascertains a value of the N according to a length of the predetermined time slot and transmission statuses of the N network devices within an interval between the two successive beacons, and afterward the another network device uses a new identification code as an identification of the another network device in the multidrop network system according to the value of N; and the new identification code is different from any of the N identification codes owned by the N network devices.

12. A network device being a cooperative network device among N network devices of a multidrop network system, the N network devices earning transmission opportunities in turn in the multidrop network system, the N network devices including a master device and (N−1) slave device(s), each of the N network devices having an identification code as an identification in the multidrop network system, and each of the N network devices performing a predetermined operation to generate a current value, wherein:
   the N is an integer greater than or equal to two;
   when the identification code of the cooperative network device is the same as the current value, the cooperative network device earns a cooperative-device transmission opportunity of the transmission opportunities; and;
   after earning the cooperative-device transmission opportunity, the cooperative network device makes a determination of whether a cut-in signal from another network device is observed in a front duration of a predetermined time slot, and then determines whether to abandon or defer a right to start transmitting in a back duration of the predetermined time slot according to the determination.

13. The network device of claim 12, wherein the cooperative network device is the master device or one of the (N−1) slave device(s); the cut-in signal is a data signal, or the cut-in signal is a request signal from the another network device asking to join the multidrop network system; and after receiving the cut-in signal, the cooperative network device abandons or defers the right to start transmitting in the back duration of the predetermined time slot.

14. The network device of claim 13, wherein the cut-in signal is the data signal; and the another network device is one of the N network devices except the cooperative network device.

15. The network device of claim 13, wherein the cut-in signal is the request signal; and the another network device is not any of the N network devices.

16. The network device of claim 15, wherein the cooperative network device is the master device; the master device receives the request signal in a round of data transmission of the multidrop network system, and accordingly adjusts a value range of the current value after the round of data transmission finishes.

17. The network device of claim 16, wherein the value range is defined by a difference between a maximum value and a minimum value; and after receiving the request signal, the master device increases the value range after the round of data transmission finishes.

18. The network device of claim 17, wherein the master device increases the maximum value to increase the value range; before the master device increases the value range, the maximum value is equal to (N−1); and after the master device increases the value range, the maximum value is equal to N.

19. The network device of claim 12, wherein the predetermined operation is an incremental count operation, and the current value is a current count value.

20. The network device of claim 12, wherein when the determination indicates that the cut-in signal is not observed, in a circumstance that the cooperative network device has no need to transmit, another device of the N network devices is assigned the cooperative-device transmission opportunity after the predetermined time slot elapses.

\* \* \* \* \*